United States Patent
Paakkinen

(10) Patent No.: US 8,829,703 B2
(45) Date of Patent: Sep. 9, 2014

(54) WAVE POWER PLANT

(75) Inventor: Heikki Paakkinen, Espoo (FI)

(73) Assignee: Wello Oy, Espoo (FI)

( * ) Notice: Subject to any disclaimer, the term of this patent is extended or adjusted under 35 U.S.C. 154(b) by 61 days.

(21) Appl. No.: 13/810,111

(22) PCT Filed: Jul. 4, 2011

(86) PCT No.: PCT/FI2011/050632
§ 371 (c)(1),
(2), (4) Date: Mar. 27, 2013

(87) PCT Pub. No.: WO2012/007639
PCT Pub. Date: Jan. 19, 2012

(65) Prior Publication Data
US 2013/0181454 A1     Jul. 18, 2013

(30) Foreign Application Priority Data

Jul. 15, 2010 (FI) ...................................... 20105804

(51) Int. Cl.
*F03B 13/22* (2006.01)
(52) U.S. Cl.
USPC ............................................................ 290/53
(58) Field of Classification Search
CPC ..................................................... F03B 13/22
USPC ........................................................... 290/53
See application file for complete search history.

(56) References Cited

U.S. PATENT DOCUMENTS

| 3,231,749 | A | 1/1966 | Hinck, III | |
|---|---|---|---|---|
| 4,266,143 | A | 5/1981 | Ng | |
| 7,538,445 | B2 * | 5/2009 | Kornbluh et al. | 290/53 |
| 7,557,456 | B2 * | 7/2009 | Kornbluh et al. | 290/42 |
| 7,649,276 | B2 * | 1/2010 | Kornbluh et al. | 290/53 |
| 8,421,259 | B2 * | 4/2013 | Ardoise et al. | 290/53 |
| 2009/0146429 | A1 * | 6/2009 | Protter et al. | 290/53 |
| 2012/0112462 | A1 * | 5/2012 | Bado et al. | 290/53 |
| 2012/0153627 | A1 * | 6/2012 | Jo | 290/53 |
| 2013/0229013 | A1 * | 9/2013 | Scharmann et al. | 290/53 |

FOREIGN PATENT DOCUMENTS

| RU | 2313690 C1 * | 12/2007 |
|---|---|---|
| WO | WO 2008051642 A2 | 5/2008 |
| WO | WO 2012103890 A1 * | 8/2012 |

* cited by examiner

*Primary Examiner* — Joseph Waks
(74) *Attorney, Agent, or Firm* — Knobbe Martens Olson & Bear LLP

(57) ABSTRACT

A wave power plant, including a floating body and a rotator capable of rotating in response to the body's floating motion, characterized in that two or more bodies are elastically moored at a distance varying from each other according to wave conditions, said distance in the traveling direction of waves being unequal to a half of the wave length or a multiple thereof, and that rotation of the rotators present in various bodies is synchronized so as to provide a desired phase shift between the rotational angles of rotators present in various bodies.

8 Claims, 3 Drawing Sheets

WAVE POWER PLANT

CROSS REFERENCE TO RELATED APPLICATION

This application claims the benefit and priority to and is a U.S. National Phase of PCT International Application Number PCT/FI2011/050632, filed on Jul. 4, 2011, designating the United States of America, which claims priority under 35 U.S.C. §119 to Finish Application Number 20105804, filed on Jul. 15, 2010. The disclosures of the above-described applications are hereby incorporated by reference in their entirety.

The invention relates to a wave power plant, comprising a floating body and a rotator capable of rotating in response to the body's floating motion.

Patent publication U.S. Pat. No. 4,266,143 discloses such a wave power plant, wherein two gravity wheels are mounted on a common vertical shaft to rotate in opposite directions.

A typical problem with this, as well as with several other wave power plant concepts, is synchronization with the wave and dead points in the trajectories. Another problem is a low unit capacity of the wave power plants.

It is an object of the invention to provide a solution for obviating or at least substantially alleviating the above problems.

This object is achieved on the basis of the characterizing features presented in the appended claim 1. Preferred embodiments of the invention are presented in the dependent claims.

One exemplary embodiment of the invention will now be described more closely with reference to the accompanying drawing, in which FIG. 1 shows a wave power plant of the invention in a perspective view obliquely from above;

Figure 1:
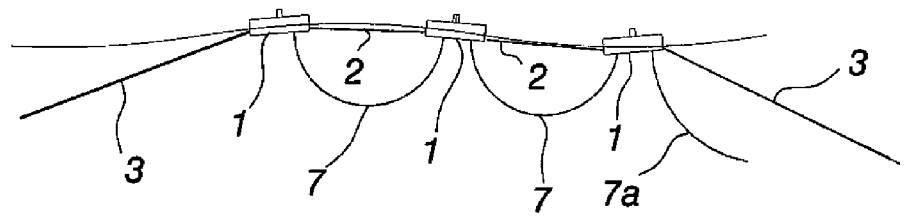
Figure 2:
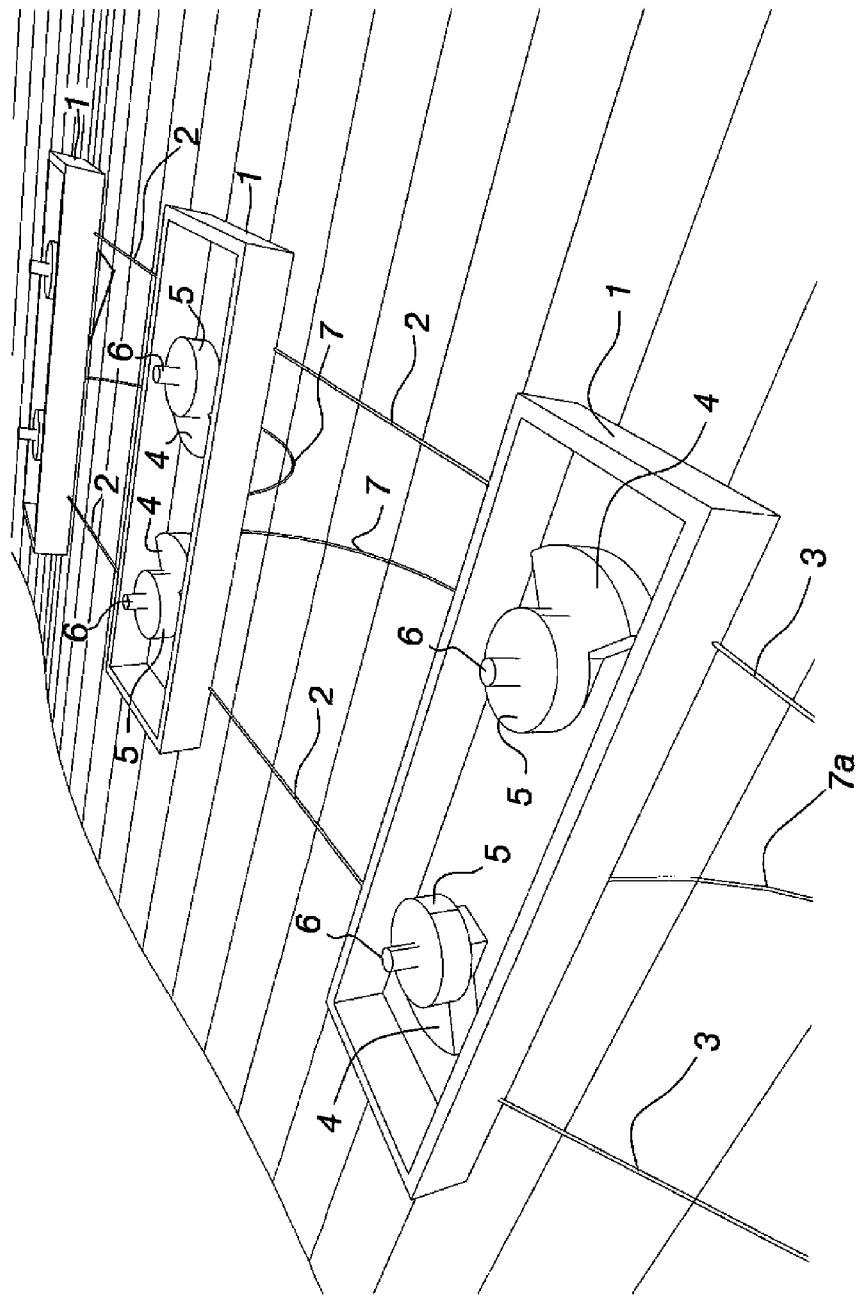
FIG. 2 shows the same wave power plant in a side view.

In the present exemplary embodiment, a plurality of floating bodies 1 are arranged one after another in the advancing direction of waves. Each body 1 has two rotators 4, which in operation rotate in opposite directions. The number of rotators may also be just one. In practice, the bodies 1 may have quite a considerable length and include a multitude of rotators 4, half of the rotators in one body being set to rotate clockwise and the other half counter-clockwise in order for the body 1 not to start moving sideways with respect to the incoming wave. In the present exemplary embodiment, the rotators 4 are mounted on separate shafts 6 and topped with generators 5.

The bodies 1 are elastically moored at a distance varying from each other according to the force of a wave in a subsequently described manner. This distance in the traveling direction of waves is unequal to a half of the wave length or a multiple thereof. Thus, the rotators 5 present in different bodies rotate in a different phase with respect to each other. By virtue of this, it is possible to arrange the rotators of various bodies to support each other's rotating motion by virtue of a joint control system, thus ensuring a continuous rotating motion of the rotators. For this purpose, between the rotators 4 present in different bodies and those present in the same body is an electrical or mechanical power transmission link 7, by means of which the rotation of the rotators is synchronized so as to provide a desired phase shift between the rotational angles of rotators present in various bodies 1. This enables the rotators present in all bodies to be maintained as well as possible at a desired phase angle in relation to the wave. This synchronization can also be carried solely by means of a regulator shown in FIG. 3, whereby the power transmission link 7 is preferably only needed for keeping the desired phase angle and for assisting the rolling of rotators across the dead points.

In the present exemplary embodiment, each rotator 4 has its designated direct-drive generator 5, and the generators 5 are in mutual communication by way of electrical control and a cable 7. Alternatively, the rotators 4 can be in communication with each other by way of power transmission, which conveys the produced energy further to a common generator. Thus, power transmission between the bodies 1 can be implemented by using either the electrical cable 7 or mechanically rotating drive cables or articulated shafts. The power transmission is required to allow for a free up-and-down and tilting movement of the bodies 1. The mooring is also required to allow for such movements, but to maintain the mutual distance between the bodies 1. In the present case, the bodies 1 are moored at a fixed distance from each other by tension ropes or cables 2 and the bodies at each end of an array of bodies are anchored with cables 3 to the bottom. The end moorings 3 extend diagonally outward, the tension ropes or cables 2 being subjected to tension and the bodies 1 staying at a fixed distance from each other. The long side of each body 1, located downstream in the direction of an incoming wave, can be provided with a surge plate for eliminating or reducing a movement occurring in the wave advancing direction.

The bodies can also be placed side by side in a slightly staggered relationship with respect to the direction of an incoming wave for ensuring a different operating phase and the continuity of rotation. Thus, the bodies do not become shadowed by each other.

By increasing the number of bodies and disposing the same at unequal distances from each other, a large operating range is achieved with waves of varying lengths.

As the body 1 is tilted by a wave, the rotators 4 rotate towards their lowest position and enable obtaining a torque which drives the generator 5 and produces electric power. When the body 1 is on top of a wave or in the bottom of a wave, the rotators do not produce a torque as their shafts 6 are in a vertical position. At this point, whenever necessary, the system receives energy from another body's rotators presently in a different phase in order to not disrupt or stop the rotating motion for example due to an irregular change of the wave period. Alternatively, energy may also be supplied from the mains from time to time for ensuring the continuity of rotating motion.

Figure 3:
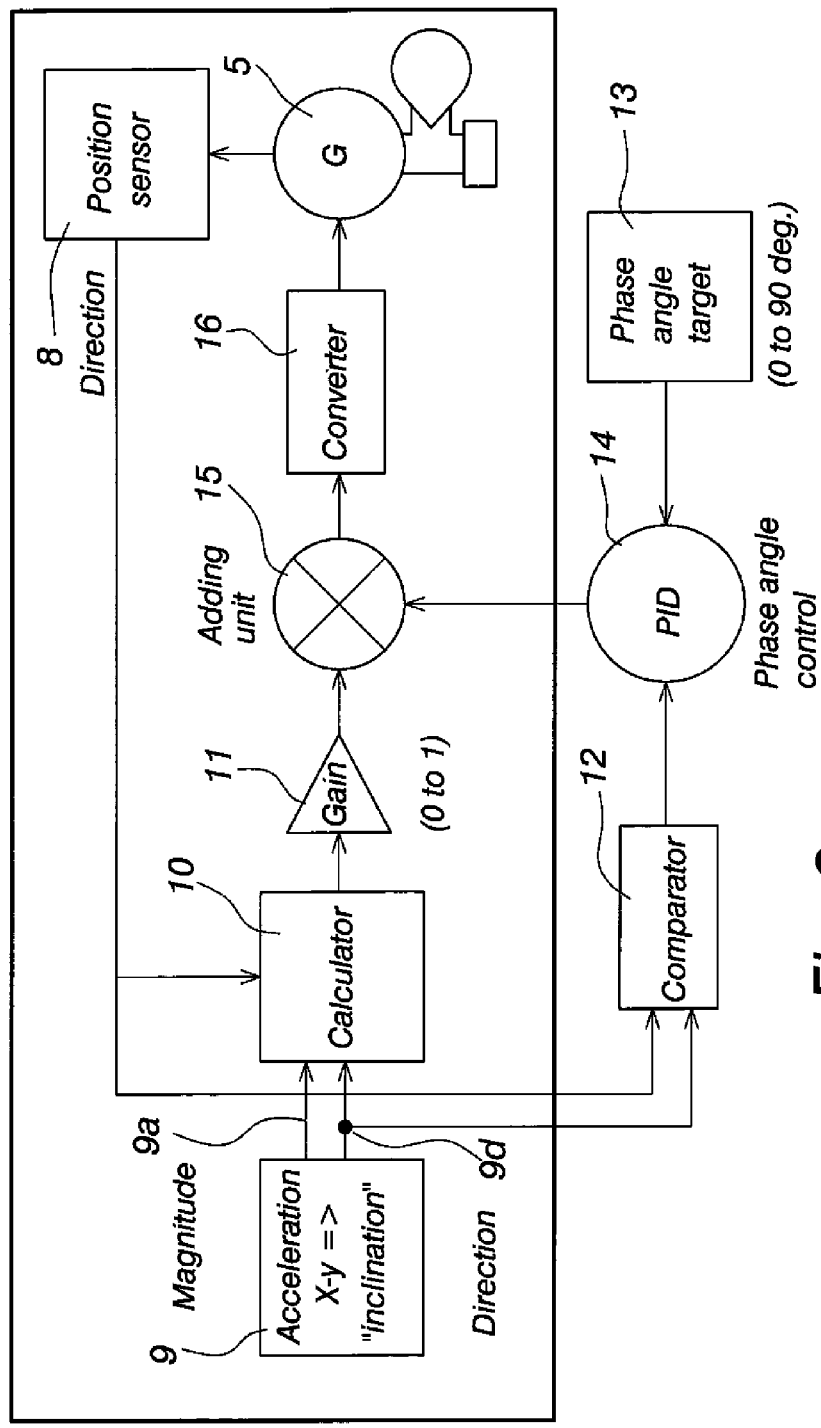
FIG. 3 shows a block diagram view of a regulator for controlling the load moment of a rotator and thereby the phase angle of a rotator with respect to a wave.

The control system shown in FIG. 3 is adaptive. It calibrates itself e.g. in accordance with quite a short-term average period and height of the wave. The rotators 4 are controlled to rotate at a rate of one cycle per every wave, and an effort is made to hold the rotators at an averagely set phase angle relative to an inclination of the body 1 for maximum performance.

The control system calculates, with respect to time and wave, which position a given rotator 4 should assume at each instant. If the rotator is running ahead of what has been set, the control system increases the resistance (moment). If the rotator 4 is running behind a target, the system reduces the resistance or, if necessary, even supplies energy from other rotators 4 for sustaining the average rate of rotation and phase angle.

In the regulator of FIG. 3, a converter 16 controls the electric power delivered by a generator 5 and thereby the moment resisting the rotation of a rotator 4. A sensor 8 measures the angular position of a rotator 4 and transmits the measurement value to a calculator 10 and a comparator 12. A sensor 9 measures the acceleration of body edges x-y, i.e. inclinations of the body, and transmits to the calculator 10 a magnitude 9a and a direction 9d of the measurement value. The inclination direction 9d is also transmitted to the comparator 12.

The actual regulation is carried out by a PD or PID controller 14, which compares a target lag of the phase angle given by an adjuster 13 with a realized lag of the phase angle obtained in the comparator 12 on the basis of a measurement value of the angular position sensor 8 and acceleration direction angles of the body x-y. A differential quantity worked out by the controller 14 is used for regulating the rotator loading moment. For enhanced regulation there is also used a control quantity obtained from the calculator 10, which is proportional to the rotator effecting moment as calculated from which is proportional to the rotator effecting moment as calculated from the acceleration of the body x-y and the angular position of the rotator. If this control quantity is taken into account by 100%, the rotator will be sort of neutral for inclinations of the body, i.e. it has no tendency to accelerate in either direction regardless of inclinations of the body.

In normal operation, both regulation components (differential quantity and control quantity) are added together in an adding unit 15 for a design moment of the generator 5. The adjustment of a gain 11 enables taking the control quantity into account by less than 100%, whereby the rotator strives to accelerate in the inclination direction of the body. Hence, the control quantity, as well as parameters of the controller 14 (phase angle target lag), can be varied to match the wave conditions (adaptivity of the power plant).

The mooring can be implemented in such a way that the mutual distance of the bodies changes for example according to the wave length. Such a mooring can be implemented for example a separate anchorage and mooring lines provided with buoys for flexibility. These buoys can be unequal in terms of their buoyancy and thereby provide unequal elasticity, which further leads to the distance between the bodies changing in different wave conditions. The longer the wave, the greater the performance and the distance increases. A respective end result is also obtained if the elasticity is achieved with unequal masses bending the mooring ropes 2 downward. The same effect is achieved by mooring ropes, chains and cables unequal in terms of elasticity. Even in these arrangements, the bodies are in contact with each other by way of a power transmission cable 7. In addition to power transmission, these cables 7 communicate from each body and each generator the information needed for control. The generators 5 can have separate inverters, but the direct voltage can be common and connected towards the mains with a single inverter. After the inverter or converter or a transformer, the cable 7a continues further to the ocean floor and thence to the shore and power grid. The cables 7 are positioned below the bodies 1 to hang in a slack arching configuration for minimizing the effect of movements and wear. The cable 7 may attach to the body under the guidance of a trumpet-shaped, downward flaring and opening pipe. The purpose of this pipe is to prevent the formation of sharp bends and to distribute the movement over a large area in the cable 7. In addition, the cable 7 can be provided in said areas with an elastic wear protection tube.

The system includes a possibility of shifting the attachment point of the cable and wear protection either manually or automatically at certain time intervals. This arrangement enables shifting the points susceptible to wear away from a wearing zone prior to the occurrence of possible damage and extending the cable service life many times over. The cable need not be disengaged during the adjustment process. Space is reserved for an extra cable within the body (and in the sea).

The generator 5 can be constructed as integrated with the rotator 4. The generator and the rotator can be disposed on top of each other or nested within each other. The generator 5 can have its rotor weighted eccentrically, thus functioning as a rotator at the same time. The rotor's magnetic poles can be disposed over just part of the periphery, thus locating the entire mass on a preferred side of the rotator. This solution enables reducing the number of bearings and making the assembly more beneficial and more reliable in operation.

What is claimed is:

1. A wave power plant, comprising a floating body and a rotator capable of rotating in response to the body's floating motion, characterized in that two or more bodies are elastically moored at a distance varying from each other according to wave conditions, said distance in the traveling direction of waves being unequal to a half of the wave length or a multiple thereof, and that rotation of the rotators present in various bodies is synchronized so as to provide a desired phase shift between the rotational angles of rotators present in various bodies.

2. A wave power plant according to claim 1, characterized in that each body has at least one generator driven by one or more rotators, and that the electric power delivered by the generator is adapted to be regulated in dependence on the angular position of a rotator or rotators in relation to the inclination angle of the body, such that said relation strives to remain at a prescribed target value.

3. A wave power plant according to claim 1, characterized in that between the rotators present in various bodies is an electrical or mechanical power transmission, which is used for assisting said synchronization of rotators for keeping the rotators at a desired phase angle in relation to the wave and/or for assisting the rolling of rotators across the dead points.

4. A wave power plant according to claim 1, characterized in that a single body carries several rotators side by side in a direction transverse to the traveling direction of waves, and that between the rotators is a power transmission which keeps the rotators at a certain angular position with respect to each other.

5. A wave power plant according to claim 1, characterized in that the bodies are elastically moored at a varying distance from each other with tension ropes or cables present between the bodies, and the bodies at each end of an array of bodies are anchored to the bottom.

6. A wave power plant according to claim 1, characterized in that each body carries at least two rotators, which in operation rotate in opposite directions.

7. A wave power plant according to claim 6, characterized in that the rotators of a single body are mounted on different shafts and have direct-drive generators in communication therewith.

8. A wave power plant according to claim 1, characterized in that between the bodies extend electrical cables or rotating power transmission cables or articulated shafts, which allow for power transmission between the bodies in various positions of the bodies.

* * * * *